United States Patent
Iacov et al.

(10) Patent No.: US 10,180,822 B2
(45) Date of Patent: Jan. 15, 2019

(54) DEVELOPMENT ENVIRONMENT FOR REAL-TIME APPLICATION DEVELOPMENT

(71) Applicant: Adobe Systems Incorporated, San Jose, CA (US)

(72) Inventors: Andra Elena Iacov, San Francisco, CA (US); Manuel Castellanos Raboso, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 74 days.

(21) Appl. No.: 15/218,559

(22) Filed: Jul. 25, 2016

(65) Prior Publication Data

US 2018/0024817 A1   Jan. 25, 2018

(51) Int. Cl.
*G06F 9/44* (2018.01)
*G06F 8/34* (2018.01)

(52) U.S. Cl.
CPC ...................... *G06F 8/34* (2013.01)

(58) Field of Classification Search
CPC ........................................................ G06F 8/34
USPC .................................. 717/109, 110, 111, 113
See application file for complete search history.

(56) References Cited

U.S. PATENT DOCUMENTS

| | | | | |
|---|---|---|---|---|
| 7,000,220 | B1* | 2/2006 | Booth | G06F 8/71 717/103 |
| 7,168,062 | B1* | 1/2007 | Schmitter | G06F 8/656 717/110 |
| 2007/0050762 | A1* | 3/2007 | Chen | G06F 8/71 717/169 |
| 2009/0055798 | A1* | 2/2009 | Chan | G06F 8/434 717/110 |

(Continued)

OTHER PUBLICATIONS

Andra Elena Iacov, 'Sneaks' with Davina McCall Part 4—Adobe Experience Manager Mobile XD, http://summit.adobe.com/emea/sessions/summit-online, Video, 2016.

(Continued)

*Primary Examiner* — Chameli Das
(74) *Attorney, Agent, or Firm* — Kilpatrick Townsend & Stockton LLP

(57) ABSTRACT

According to certain embodiments, a development environment for mobile applications includes a design environment executed by a computing system in communication with a group of viewing applications operating on a group of mobile devices. The viewing applications correspond to version(s) of an application under development. In some embodiments, the design environment is capable of receiving inputs from a designer to modify the application under development. In some embodiments, the design environment provides to the viewing applications, during run-time and in real time, dynamic instructions based on the designer's modifications. In some embodiments, each viewing (Continued)

application executed by each mobile device includes localized features corresponding to features of the application under development, each localized feature optimized for the mobile device. In some embodiments, each viewing application is capable of receiving a dynamic instruction, and modifying, during run-time and in real time, the corresponding localized feature based on the received dynamic instruction.

16 Claims, 10 Drawing Sheets

(56) References Cited

U.S. PATENT DOCUMENTS

| | | | |
|---|---|---|---|
| 2014/0039992 A1* | 2/2014 | Amidon | G06Q 10/10 705/14.4 |
| 2014/0047411 A1* | 2/2014 | Palmateer | G06F 8/51 717/106 |
| 2014/0304689 A1* | 10/2014 | San Jose | G06F 8/71 717/134 |
| 2015/0109967 A1* | 4/2015 | Hogan | H04M 15/66 370/259 |
| 2016/0142453 A1* | 5/2016 | Paladugu | H04L 65/1066 709/204 |
| 2017/0242724 A1* | 8/2017 | Gilbert | G06F 9/45558 |

OTHER PUBLICATIONS

Nick Bogaty, New Design & Developer Tools Transform Apps for the Experience Business, https://blogs.adobe.com/digitalmarketing/mobile/new-design-developer-tools-transform-apps-experience-business/ , Mar. 23, 2016, 3 pages.

Adobe System Incorporated, Adobe Summit Sneak: Integration Between Adobe Experience Design and Adobe Experience Manager https://www.youtube.com/watch?v=OEPspAfDA6M&feature=youtu.be, Mar. 18, 2016.

* cited by examiner

DEVELOPMENT ENVIRONMENT FOR REAL-TIME APPLICATION DEVELOPMENT

TECHNICAL FIELD

This disclosure relates generally to the field of application development, and more specifically relates to modification of an application developed for multiple mobile computing devices.

BACKGROUND

Applications for mobile computing devices (also referred to herein as "mobile devices"), e.g., "smart phones" or tablet computers, etc., can be developed through cycles of design and programming. Current methods of application development often involve multiple iterations of design, such as for the visual appearance of a graphical user interface, followed by multiple iterations of programming, such as for the code required to implement a graphical user interface. In some cases, the time and effort required to program a particular feature of an application may be wasted, if it is realized that the feature will not serve the intended purpose. For example, a navigation menu could be designed to have a very sophisticated response to user interaction. The programming of a such a navigation menu could require many hours of coding. If a developer realizes, after spending many hours on coding, that the navigation menu will not provide the needed response, or that it will not function similarly on different types of devices, the resources spent developing the menu are non-recoverable, and can increase production costs of the application.

In addition, current methods of application development provide inadequate ways to view changes made to an application during development. Although some changes can be previewed in a simulated operating environment (e.g., a simulated mobile screen and operating system), not all types of application behavior can be accurately modeled in a simulation, making it difficult to accurately test changed features. Also, if the application is being developed for use on a very wide variety of mobile devices, a simulation may not be available for each type of device.

For at least the above reasons, it is desirable to develop applications in an environment that allows rapid implementation of proposed design changes. It is also desirable to quickly view proposed design changes in an operable application that incorporates the proposed changes. It is also desirable to quickly view proposed design changes implemented on multiple types of devices, which may run different operating systems or different versions of an operating system. Current environments for application development do not enable real time design and implementation across multiple types of devices.

SUMMARY

According to certain embodiments, a development environment for mobile applications includes a design environment executed by a computing system in communication with a group of viewing applications. In some embodiments, the viewing applications operate on a group of mobile devices. In additional or alternative embodiments, the design environment includes a user interface capable of displaying a template that corresponds to an application under development. In additional or alternative embodiments, a designer or other user provides inputs to the computing system so as to interact with and modify the template application. In additional or alternative embodiments, the design environment provides to the viewing applications dynamically executable instructions based on the designer's modifications. An example of dynamically executable instructions (also referred to herein as "dynamic instructions") are digital instructions that can be entered into an application, such as a viewing application, while the application is running, thus changing a feature of an application (e.g., an appearance, behavior, or function of the application) while the application is operating. In some embodiments, an operating application capable of receiving dynamic instructions can be modified during operation, without pausing operation and without compiling instructions.

In some embodiments, each of the viewing applications operates on a different mobile computing device (e.g., mobile devices having different hardware, operating systems, and/or versions of an operating system). In additional or alternative embodiments, each viewing application includes an orchestrator module and a group of controller modules. In additional or alternative embodiments, each controller module corresponds to a localized feature of the viewing application. In additional or alternative embodiments, the orchestrator module is capable of implementing interactions between controller modules, or their corresponding localized features, or both. In additional or alternative embodiments, a controller module is capable of receiving a dynamic instruction, and modifying the corresponding localized feature based on the received dynamic instruction. In additional or alternative embodiments, the orchestrator module is capable of implementing or modifying an interaction between controller modules based on a dynamic instruction received by a controller module, a dynamic instruction received by the orchestrator module, or both.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION OF THE DRAWINGS

Figure 1:
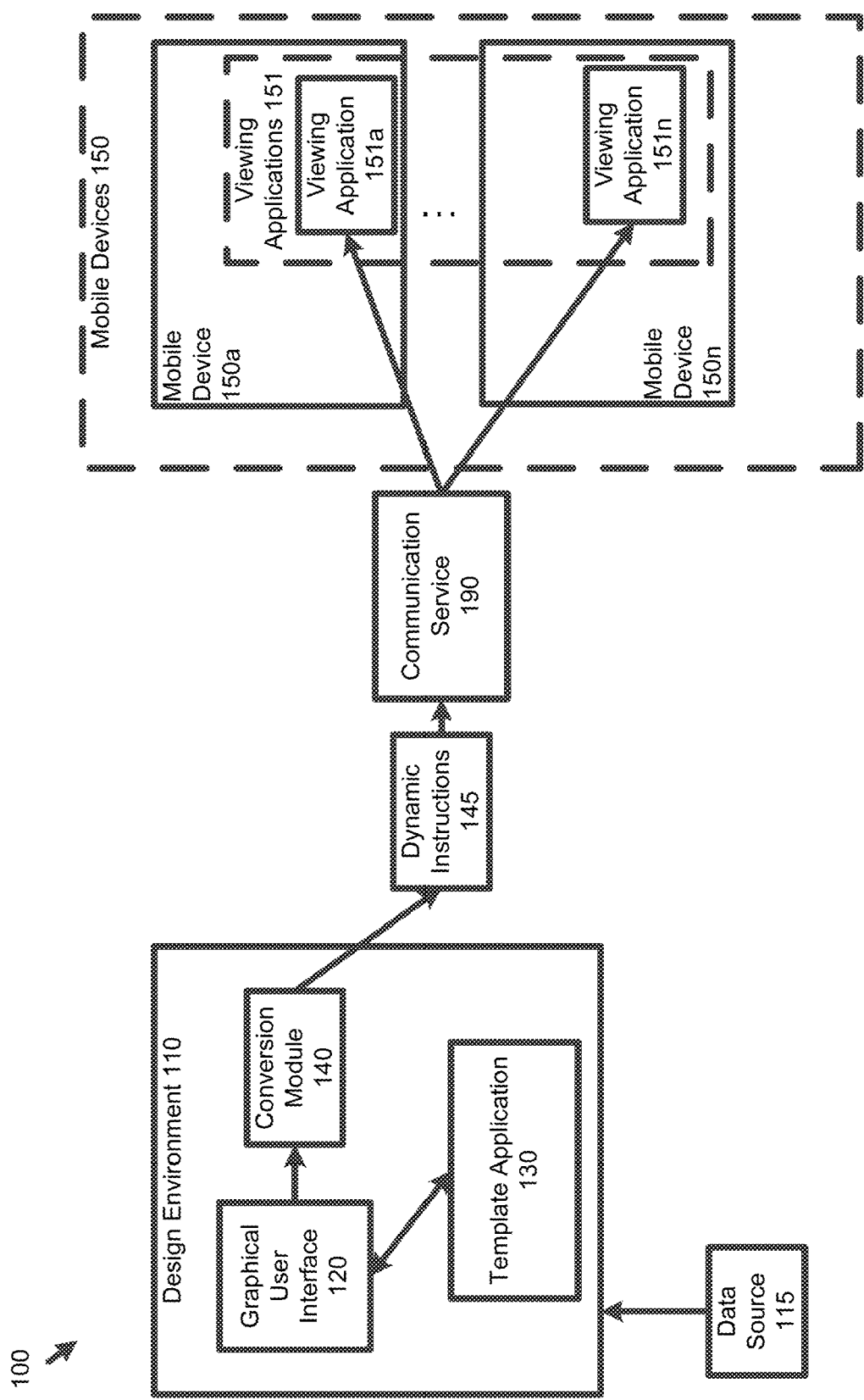
FIG. 1 is a block diagram depicting an example of a computing environment in which an application for mobile devices can be developed, according to certain embodiments.

As discussed above, prior techniques for developing applications do not provide adequately fast translation of design concepts to implemented application features. Nor do prior techniques provide sufficiently accurate methods to view and test design modifications on a variety of mobile devices. It is a goal of the present invention to provide a development environment that is capable of receiving modifications to an application under development, and implementing the modifications in operable viewing applications on a variety of mobile devices. It is a further goal of the invention that the provided development environment is capable of implementing such modifications during operation of the viewing applications, in real time or nearly real time, allowing a designer to view and interact with the resulting modified viewing applications. A development environment may include a design environment capable of receiving modifications, such as from a designer, and may further include a group of viewing applications, each capable of modifying its own features based on received modifications. In some cases, a viewing application could be separated from the development environment and from the design environment, such as for release as a stand-alone application.

The following examples are provided to introduce certain embodiments of the present disclosure. In certain embodiments, a design environment is provided, the design environment executed on a suitable computing system having a suitable display device and one or more suitable input devices. The design environment communicates with a group of mobile devices, each mobile device executing a viewing application. The design environment displays a user interface, such as a user interface to enable design of an application for mobile devices. The user interface displays a template of an application under development. For example, a displayed template could comprise one or more views of the application, such that each view could represent one or more features of the application. One or more views of the application correspond to a particular mobile device in the group with which the design environment is capable of communicating.

The designer interacts with the design environment (e.g., provides user inputs) to create or modify the template, or a particular view included in the template. For example, the designer might input commands for modifying one, some, or all of the views. In some embodiments, the input commands indicate a modification to a feature of the application under development, the feature corresponding to a modified view.

The design environment converts an indicated modification to one or more dynamically executable instruction that describe(s) the indicated modification. A generated dynamic instruction may correspond to multiple mobile devices in the group. For example, the design environment could create a dynamic instruction that corresponds to both a mobile device having an IOS operating system and a mobile device having an ANDROID operating system. The example dynamic instruction could describe a modification that corresponds to both types of mobile device.

The design environment provides the generated dynamic instruction to one, some, or all of the mobile devices in the group. A viewing application operating on a mobile device is modified based on the received dynamic instruction. The dynamic instruction is provided to the viewing application during operation, in real time or nearly real time. Thus, the viewing application is an operable localized application corresponding to an application under development and configured to communicate with the design environment. For example, the viewing application could be an operable application corresponding to a template application displayed in the design environment. The viewing application may have localized features corresponding to features of an application under development, and also corresponding to views in a template application. The viewing application, or the localized features, or both, are optimized for operation on the mobile device.

A viewing application may include one or more controller modules, capable of controlling localized features, and an orchestrator module, capable of managing interactions between controller modules. The viewing application could modify a localized feature based on a received dynamic instruction. For example, a controller module could modify a corresponding localized feature responsive to receiving a dynamic instruction. An orchestrator module could modify an interaction between controller modules responsive to receiving the same, or different, dynamic instruction. The dynamic instruction is received by the viewing application during operation (e.g., during execution, during "run-time") of the viewing application and the localized features. Modifications described by the dynamic instruction may be implemented in the localized features during operation of the viewing application and localized view and features.

As used herein, the terms "development" and "application development" are used to refer to the process of creating, modifying, and localizing an incomplete application. In some embodiments, development includes design of visual or interactive features of an incomplete application. In additional or alternative embodiments, development includes generation of computer-implemented instructions that implement the features of an incomplete application in a computing environment. In additional or alternative embodiments, development includes generation of computer-implemented instructions that optimize the operation of localized features for a particular computing environment, such as on a particular mobile device.

As used herein, the term "application under development" is used to refer to an incomplete application that is being developed, designed, or modified by one or more users, such as a designer or programmer. An application under development includes one or more viewing applications, each of which implements an operable implementation of the application that is optimized for a particular mobile device. In some embodiments, an application under development can be represented by a template application, such as could be modified in a design environment. In some embodiments, an application under development has one or more features.

As used herein, the terms "feature" and "feature under development" are used to refer to a component of an application under development. In some embodiments, a feature could be any of an appearance of the application (e.g., a page layout, a visual theme); a behavior of the application (e.g., an animation, a response to customer input); a function of the application (e.g., performing a search query); or an interaction with digital or network components outside of the application (e.g., accessing a database of product information). In some embodiments, the represented feature could be any other suitable application feature, or a combination of features. A feature can have one or more attributes. For example, a navigation menu could be a feature, having attributes such as a size, shape, color, and quantity of menu buttons. A feature attribute could also be associated with one or more additional features. For example, the quantity of buttons in the navigation menu could be associated with additional button features, each button having additional attributes such as height, width, text, and navigation action.

As used herein, the term "viewing application" is used to refer to an operable implementation of an application under development. A viewing application is optimized for a particular mobile device, or type of mobile device, based on the qualities of that mobile device. In some embodiments, the viewing application is optimized based on qualities such as operating system, other installed software, software version (including the version of an operating system), hardware specifications, device manufacturer, user language, geographic region, or any other suitable quality. In certain embodiments, a viewing application can be separated from the application, such that it is no longer associated with the application under development. An example of such separation could be digitally "signing" the viewing application, and providing it to a repository of completed applications (e.g., no longer under development) for sale or other distribution. In additional or alternative embodiments, the viewing application is separable from the application under development without requiring additional preparation. For example, the viewing application could be separable without requiring compiling. In additional or alternative environments, a separated viewing application is still capable of receiving dynamic instructions from a design environment, as described herein. For example, a separated viewing application that is "signed" and provided to a repository of completed applications could still receive dynamic instructions including modifications to the separated viewing application.

As used herein, the term "design environment" is used to refer to a software-implemented environment that provides tools and interfaces to enable design of an application under development. In some embodiments, a design environment enables design of features under development, including appearance, behavior, function, interaction, or any other suitable component of an application under development. In some embodiments, the design environment provides a model of the features under development, such as a template application.

As used herein, the terms "template application" and "template" are used to refer to a non-operable model of an application under development. A template application can be displayed in a design environment. In some embodiments, templates have views representing features of the application under development.

As used herein, the term "view" is used to refer to a representation of a feature under development. In some embodiments, a view is a non-operable model of a feature under development. A view can represent any feature, or type of feature, of the application under development (e.g., page, user interface, wireframes, asset collections, links, etc.). A view can represent multiple features. A particular feature can be represented by multiple views.

As used herein, the terms "dynamically executable instruction" and "dynamic instruction" are used to refer to a computer-implemented instruction describing a feature, or an attribute of a feature, of an application under development. In some embodiments, a dynamic instruction is implemented in computer-readable program code that is independent of a specific computing environment (e.g., independent of a specific operating system or type of computer hardware). For example, the dynamic instruction could be independent of a specification of the mobile device. In some embodiments, a dynamic instruction describes a modification to a feature.

As used herein, the terms "real time" and "real-time" are used to refer to a period of time that is short enough to avoid noticeable delay to a user, unless otherwise noted. In one example, a designer provides, to a user interface in a design environment, inputs describing a modification to an application under development. Responsive to the design environment receiving the exemplary inputs, a viewing application implements the modification in a period of time that is short enough to present the implemented modification to the designer without noticeable delay. In various embodiments, "real-time" operations involve different periods of time for different modifications of different application features. In various embodiments, "real-time" operations involve different periods of time for different modifications of different mobile devices.

As used herein, the terms "operation" and "normal operation" are used to refer to a mode of operation in which an operable application performs its typical functions (e.g., "run-time"). An example of an operable application includes a viewing application. Examples of typical functions include responding to user interactions, such as accepting user input, or ongoing background functions, such as scanning incoming email for viruses. In some embodiments, normal operation excludes modes of operation that prevent the operable application from performing its typical functions, such as while receiving updates or while powering down.

Referring now to the drawings, FIG. 1 is a block diagram depicting an example of a computing environment 100 in which an application for mobile devices can be developed. The depicted computing environment 100 includes a design environment 110, the design environment 100 being operable on a suitable computing device (e.g., a personal computer, a server, a handheld computing device). The depicted computing environment 100 further includes at least one mobile device 150. In certain embodiments, computing environment 100 optionally includes a communication service 190 to facilitate communications between the design environment 110 and the group of mobile devices 150 (including individual mobile devices 150a through 150n). In additional or alternative embodiments (not depicted), the design environment 110 communicates with the mobile devices 150 without a communication service 190. In certain embodiments, computing environment 100 optionally includes one or more data sources 115 capable of providing additional information (e.g., product information data, customer account data), which may be used by the application under development, including by a viewing application after development is complete. For example, a separated viewing application could include additional information from data source 115, or could be capable of connecting to data source 115 via mobile device 150 (not depicted in FIG. 1).

The design environment 110 enables a designer to modify the application under development. In some embodiments, the design environment 110 displays a graphical user interface 120. The user interface 120 displays part or all of a template application 130 corresponding to the application under development. For example, the user interface 120 could display one or more views (such as view 240 shown in FIG. 2) that are included in the template application 130. A designer may use any suitable user input device (e.g., keyboard, mouse or other pointer device, touchscreen, etc.) to provide inputs indicating a modification to the application under development. In some embodiments, the design environment 110 modifies the template application 130 based on the received inputs, as described regarding FIG. 2. In additional or alternative embodiments, the received inputs are provided to a conversion module 140 that converts the inputs to one or more dynamic instructions 145. The dynamic instructions 145 are provided to the mobile devices 150, via the communication service 190 or directly to the mobile devices 150.

In some embodiments, each of the mobile devices 150 executes a viewing application 151. For example, a particular mobile device 150a executes a particular viewing application 151a, while a different particular mobile device 150n executes a different particular viewing application 151n. Each of the viewing applications 151 corresponds to the application under development, and is an operable application that is optimized for the particular mobile device 150 on which the viewing application 151 operates. For example, a viewing application 151a is optimized for mobile device 150a, and is compatible with the hardware, operating system, and other software that are included in or with mobile device 150a. A different viewing application 151n is optimized for mobile device 150n, and is compatible with the different hardware, different operating system, and different software that are included in or with mobile device 150n. In some embodiments, the viewing applications 151 include additional functional modules, as described in regards to FIG. 4.

In some embodiments, the dynamic instructions 145 are received by one, some, or all of the viewing applications 151. In some embodiments, a viewing application 151 is modified in response to receiving the dynamic instructions 145. In additional or alternative embodiments, a particular viewing application 151a is modified differently from a different viewing application 151n, in response to receiving a same dynamic instruction 145. For example, if two viewing applications 151a and 151n receive the same dynamic instruction 145 that describes a modification to a feature of the application under development, both viewing applications 151a and 151n could be modified to optimize their operation on respective mobile devices 150a and 150n. A first localized feature of the viewing application 151a could have a first modification to optimally correspond to the modified feature, the first modification based on the hardware, software, and other features of the mobile device 150a. A second localized feature of the viewing application 151n could have a second modification to optimally correspond to the same modified feature, the second modification based on the hardware, software, and other features of the mobile device 150n. In additional or alternative embodiments, the respective modifications occur in real-time or nearly real-time, during operation of the viewing applications 151a and 151n.

Figure 2:
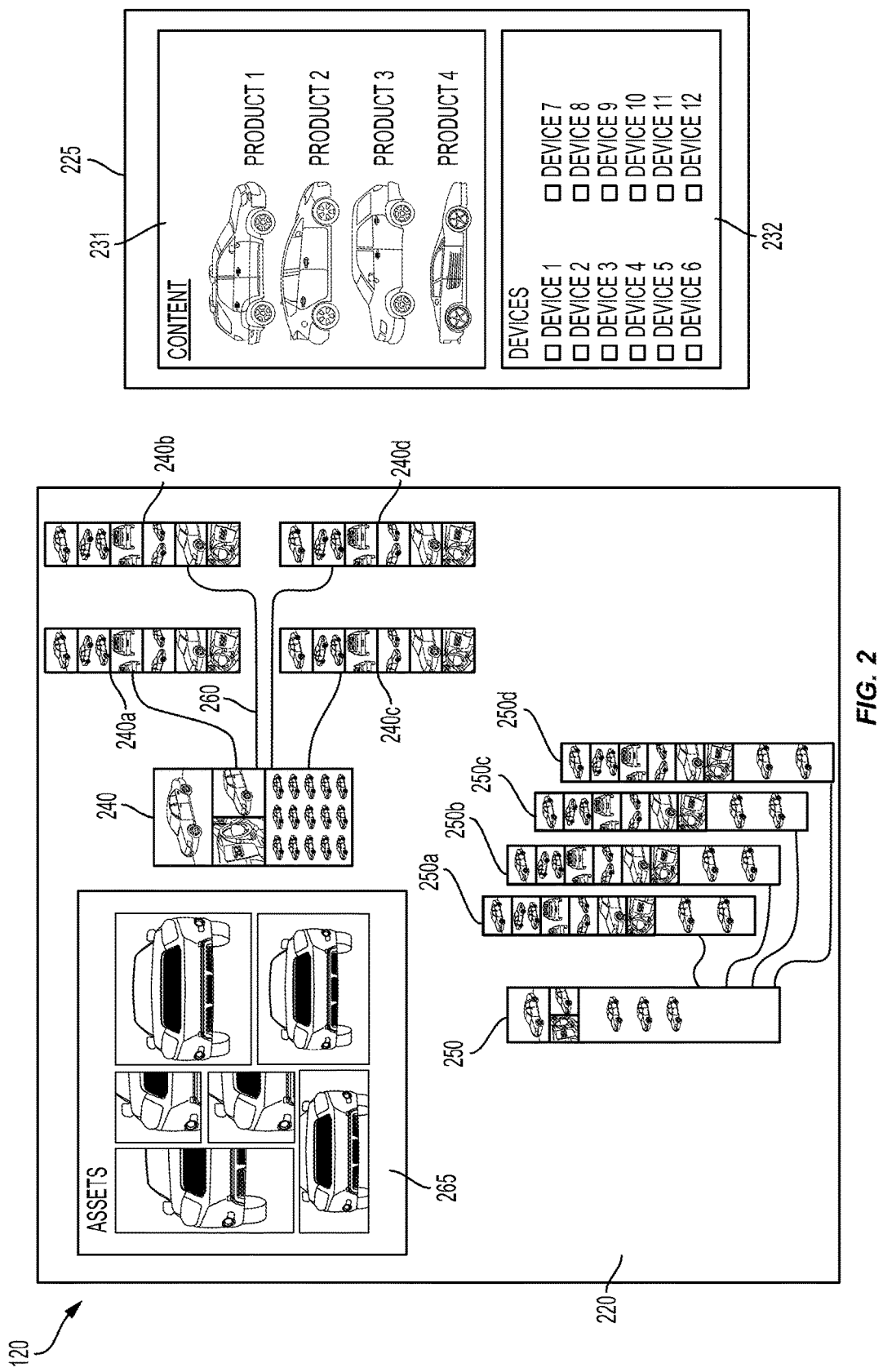
FIG. 2 is a diagram depicting an example of a user interface for a design environment, according to certain embodiments.

A diagram illustrating an example graphical user interface 120, such as for a design environment 110, is depicted in FIG. 2. The depicted user interface 120 includes a display area 220, and a collection of controls 225. A user provides input commands to interact with the user interface 120, for example, to interact with controls 225 or with other elements displayed in display area 220 (e.g., using "drag and drop" interactions). In some embodiments, the display area 220 displays one or more views that are included in a template application corresponding to an application under development. For example, view 240 and view 250 could be included in a template application, such as template application 130 described in regards to FIG. 1. In some embodiments, views represent features of the application under development. For example, views 240 and 250 could represent a same feature, such as a page to which a customer could navigate. The view 240 can be associated with additional views 240a-240d and the view 250 can be associated with additional views 250a-250d, each additional view representing an additional feature (e.g., additional pages) of the application under development. The particular view 240 could be associated with a mobile device 150a having a particular quality (e.g., screen size, operating system, software version, etc.), or with a set of mobile devices 150 that share the quality. The different view 250 could be associated with a different mobile device 150n, or a set of devices, having one or more different qualities.

In some embodiments, multiple views represent a same feature of the application under development. For example, views 240 and 250 could represent a same feature of the application, such as a number of pages, a visual theme, or a set of product information presented in the application. In some embodiments, multiple views represent a different implementation of a same feature of the application under development. For example, views 240 and 250 could represent different implementations of a same feature of the application, such as different sizes of images displayed on a screen, or a navigation menu that behaves differently on different operating systems. In additional or alternative embodiments, display area 220 displays other representations of additional features of the application under development, such as a link 260 between views (e.g., navigation links) or set of media assets 265 that are used in the application. In some embodiments, each of the views, or a group of views, corresponds to a particular mobile device with which the design environment 110 can communicate.

In some embodiments, inputs, such as from a designer can modify a view of the template application, such as an appearance of view 240 in display area 220. Received inputs can thus indicate a modification to one or more features of the application under development. The received inputs could be converted to dynamic instructions, such as described in regards to FIG. 3. In additional or alternative embodiments, the received input indicates a modification to a feature associated with a particular category of mobile devices. For example, a received input may indicate a modification to a color feature associated with mobile devices having a particular operating system. The example received inputs could also modify the display of views associated with the mobile devices having the particular operating system.

In some embodiments, inputs received from the user modify additional features of the application under development. The additional features could be represented by components, such as controls 225, of the graphical user interface 120 other than the template application 130. For example, a content list 231 could represent content information, such as from data source 115, that is coordinated between multiple features of the application under development. As an additional or alternative example, a device list 232 could represent one or more of the mobile devices 150 in communication with the design environment 110. In some embodiments, dynamic instructions may be generated and provided to a mobile device 150, based in part on inputs to device list 232. For example, dynamic instructions could be delivered to mobile devices 150 that are indicated (e.g., checked boxes) on device list 232.

Figure 3:
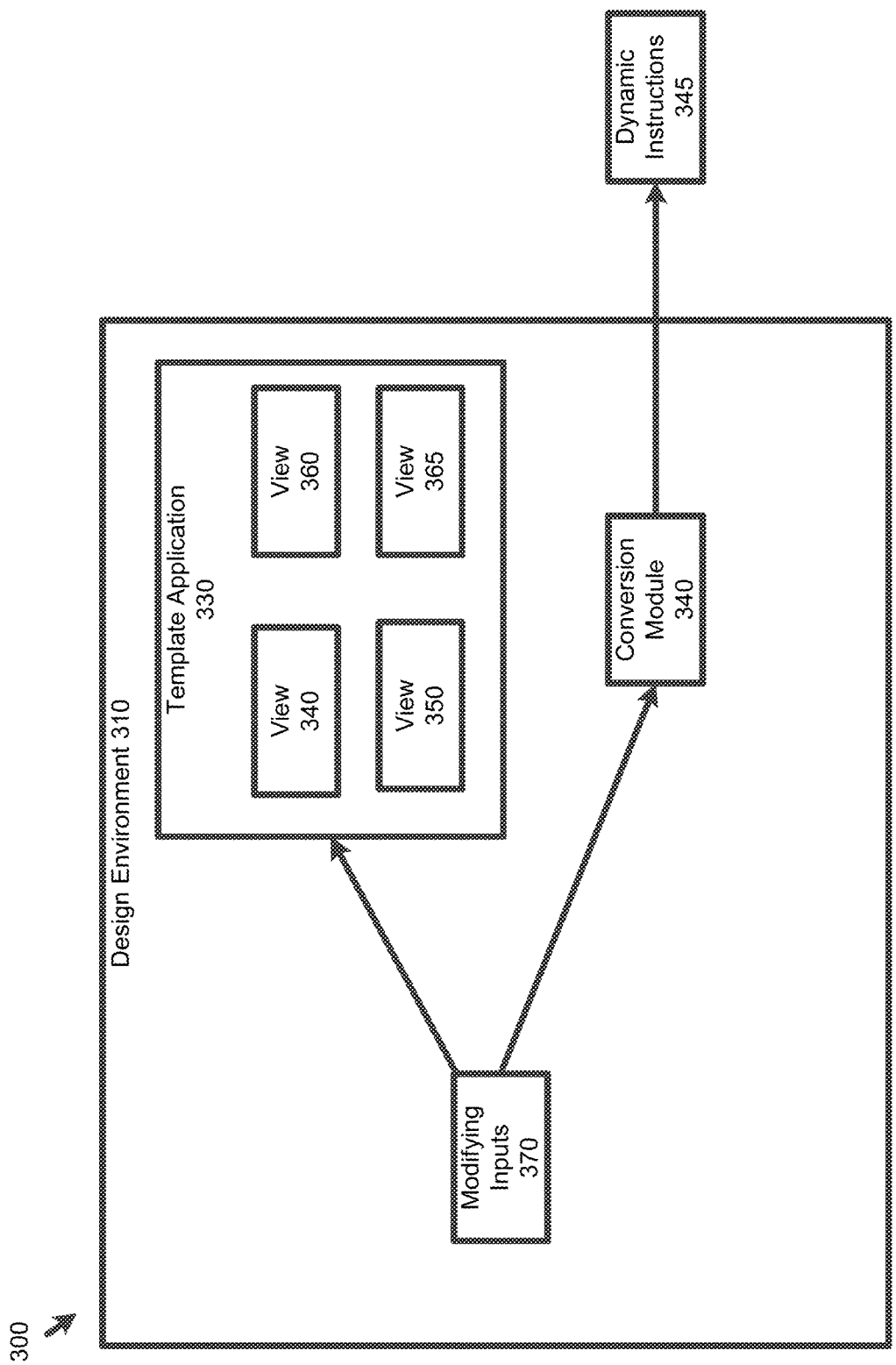
FIG. 3 is a block diagram depicting an example of a computing environment for a design environment, according to certain embodiments.

In some embodiments, a design environment includes a conversion module. A block diagram of an example computing environment 300 having a design environment 310 and a conversion module 340 is depicted in FIG. 3. The depicted design environment 310 also includes a template application, such as template application 330, having one or more views, such as views 340, 350, 360, and 365. The template application 330 could be displayed in a graphical user interface, such as graphical user interface 120 described in regards to FIGS. 1-2.

In some embodiments, the design environment 310 receives one or more inputs, such as modifying inputs 370. For example, the modifying inputs 370 could be received via user interactions with any appropriate input device, as described in regards to FIGS. 1-2. The modifying inputs 370 could modify the display of the template application 330 in the graphical user interface. For example, an appearance of the template application 330 or any view 340, 350, 360, or 365 could be modified based on the modifying inputs 370.

The modifying inputs 370 also indicate a modification to the application under development, or a modification of one or more features of the application under development. For example, the modifying inputs 370 could indicate that a change should be made to a home page feature of the application under development. In additional or alternative embodiments, responsive to receiving the modifying inputs 370, the modifying inputs 370 are provided to a conversion module 340. The modifying inputs 370 could be provided to the conversion module 340 prior to, concurrent with, or after the template application 330 is modified based on the same modifying inputs 370. In some embodiments, the conversion module 340 interprets the modifying inputs 370 and identifies one or more indicated modifications based on the modifying inputs 370. In some embodiments, the conversion module 340 converts the identified modification into dynamically executable instructions, such as dynamic instructions 345. The dynamic instructions 345 are generated based on the identified modification, the modifying inputs 370, or both. In additional or alternative embodiments, generated dynamic instructions 345 are provided to one or more viewing applications, as described in regards to FIGS. 4-5.

In some embodiments, the dynamic instructions 345 describes the modification indicated by the modifying inputs 370. In some embodiments, the dynamic instructions 345 describe a modification that corresponds to each of the mobile devices 150 in communication with the design environment 310. In additional or alternative embodiments, the dynamic instructions 345 describe a modification that corresponds to mobile devices 150 having a particular quality, such as a modification that corresponds to mobile devices 150 having a particular screen size.

Figure 4:
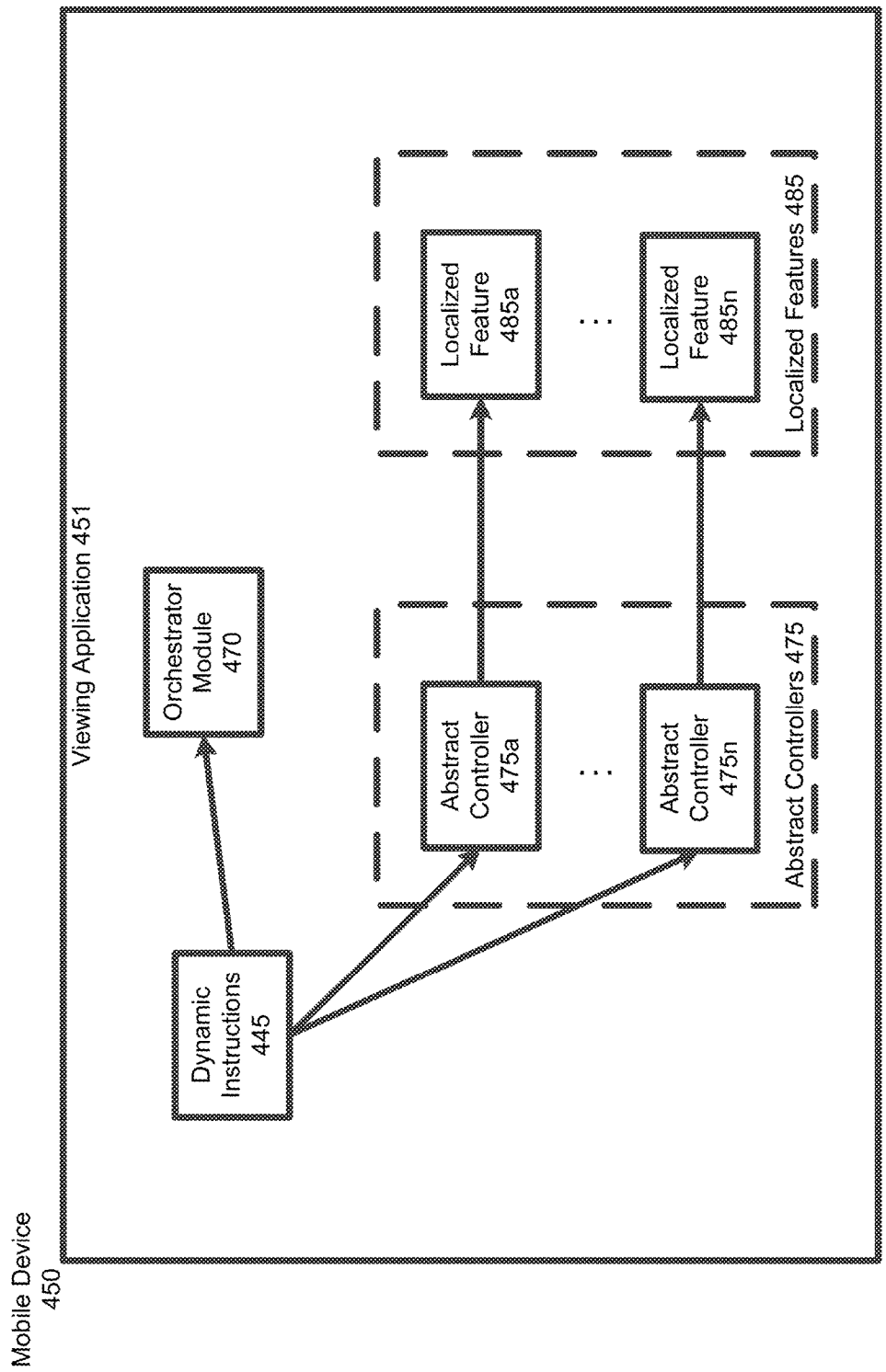
FIG. 4 is a block diagram depicting an example of a viewing application operated on a mobile device, according to certain embodiments.

In some embodiments, dynamic instructions are received by one or more viewing applications. A block diagram of an example viewing application 451, operating on an example mobile device 450, is depicted in FIG. 4. In some embodiments, the mobile device 450 is one of a group of mobile devices. The viewing application 451 can include one or more localized features 485 (including individual localized features 485a-485n), each of which corresponds to one or more features in the application under development. In additional or alternative embodiments, each of the localized features has one or more localized attributes, such that modifying the localized feature comprises modifying one or more of its localized attributes. In some embodiments, the localized features or localized attributes are optimized for operation on a mobile device 450 running the viewing application 451.

In some embodiments, the viewing application 451 has one or more controller modules 475 (including individual controller modules 475a-475n). A controller module 475 may be a programming structure that includes programming code (such as instructions, input interfaces, memory structures, or any other suitable code executable by a processor) that is capable of receiving and interpreting dynamic instructions, and enabling a localized feature 485 based on received dynamic instructions. In some embodiments, a controller module 475 could enable a localized feature 485 based on default instructions, such as if dynamic instructions have not been received. Each of the controller modules 475 enables a localized feature 485 that is a component of the viewing application 451. For example, a viewing application 451 could include the localized features 485 of a home page, a login area, and a navigation button, each of which is enabled by a particular one of the controller modules 475. In some embodiments, the controller modules 475 are specialized for one of more qualities of the mobile device 450. For example, one or more of the controller modules 475 could be specialized for operation on a tablet device running a particular software version of a particular operating system.

In some embodiments, the viewing application 451 has an orchestrator module 470. An orchestrator module 470 may be a programming structure that includes programming code (such as instructions, input interfaces, memory structures, or any other suitable code executable by a processor) that is capable of receiving and interpreting dynamic instructions, and enabling interactions of one or more controller modules 475 based on received dynamic instructions. In some embodiments, the orchestrator module 470 enables interactions between the controller modules 475 (not depicted in FIG. 4 for clarity). For example, the orchestrator module 470 could transfer data between one or more of the controller modules 475. In additional or alternative embodiments, after development is complete and the viewing application 451 is separated from the application under development (e.g., digitally "signed" and provided to a repository of completed applications), the orchestrator module 475 provides additional functions for the completed application. For example, the orchestrator module could monitor user navigation interactions with the completed application, and pre-load content for an expected next navigation, based on the monitored navigations.

In certain embodiments, received dynamic instructions 445 are provided to the orchestrator module 470, one or more controller modules 475, or both. Responsive to receiving the dynamic instruction 445, a controller module 475 modifies the corresponding localized feature 485. In additional or alternative embodiments, the controller module 475 extracts, from the dynamic instruction 445, information describing an indicated modification for a feature of the application under development. In additional or alternative embodiments, the controller module 475 determines a particular modification that is optimized for the local feature 485. The determination of the optimized modification could be based on the information extracted from the dynamic instruction 445, qualities of the controller module, qualities of the mobile device 450, or any other suitable factor or combination of factors.

For example, a first controller module 475*a*, corresponding to a first localized feature 485*a* of a home page, could receive a dynamic instruction 445 describing a modification to a visual theme of the application under development. The first controller 475*a* could modify multiple attributes of the localized home page feature, such as a text font, a text color, and a background color. A second controller module 475*n*, corresponding to a second localized feature 485*n* of a navigation button, upon receiving the same dynamic instruction 445, could modify a single attribute of the localized navigation button, such as a text font. Additionally or alternatively, a third controller module included in a different viewing application on a different mobile device (not depicted in FIG. 4), and corresponding to a third localized feature of a home page, could receive the same dynamic instruction 445. The third controller could modify different attributes of the localized home page feature that are suitable for the different mobile device, such as a text font, a text color, and a text size.

In some embodiments, responsive to receiving the dynamic instruction 445, the orchestrator module 470 modifies an interaction between controller modules 475. In additional or alternative embodiments, the orchestrator module 470 extracts, from the dynamic instruction 445, information describing an indicated modification for a feature of the application under development. In additional or alternative embodiments, the orchestrator module 470 determines an optimized modification for a particular interaction between two or more controller modules, or between at least one controller module and an additional component of the mobile device 450. The determination of the optimized modification could be based on the information extracted from the dynamic instruction 445, qualities of the controller modules involved in the modification, qualities of the mobile device 450, or any other suitable factor or combination of factors.

In a non-limiting illustrative example, an example viewing application may have a first controller module that enables a localized content display area feature, a second controller module that enables a localized home page feature, and an orchestrator module that enables interactions between the two controller modules. The viewing application may receive an example dynamic instruction describing a modification to the content display area, such as from displaying product reviews to displaying product images. The dynamic instruction may be provided to the two controller modules and the orchestrator module. Responsive to receiving the dynamic instruction, the first controller module could modify the localized content display area feature, such as by increasing the size of the content display area. The second controller module could make no change to the localized home page feature responsive to receiving the dynamic instruction, as the exemplary dynamic instruction does not describe a modification to the home page. However, the orchestrator module, responsive to receiving the dynamic instruction, could enable an interaction between the two controller modules such that the second controller module modifies the localized home page feature to accommodate the modified content display area. In an additional example, the exemplary orchestrator module may enable interactions between the controller modules after development is complete, such that the second controller module modifies the localized home page feature to accommodate different sizes of product images displayed in the content display area.

In some embodiments, receiving the dynamic instructions, providing the dynamic instructions 445 to the controller module 475 or orchestrator module 470, and updating the corresponding localized feature 485 or interaction occur in real-time or nearly real-time. In additional or alternative embodiments, the dynamic instructions 445 are provided to the mobile devices in response to a received input, such as an input received via user interface 120. In additional or alternative embodiments, responsive to receiving the dynamic instructions 445, the controller module 475 or orchestrator module 470 modifies, respectively, a localized feature or interaction automatically, requiring no additional input from a designer or developer.

In certain embodiments, the dynamic instructions are received by the viewing applications from a design environment. In some embodiments, the dynamic instructions are provided by the design environment to a communication service. For example, the design environment could provide a dynamic instruction to the communication service responsive to the dynamic instruction being generated (e.g., a "push" communication), and the viewing applications could request (and subsequently receive) the dynamic instruction from the communication service via periodic requests to the communication service for any new dynamic instruction (e.g., a "pull" communication). In some embodiments, push or pull communications occur in real time or nearly real time. In additional or alternative embodiments, the communication service operates as a secured environment, such that dynamic instructions are received or provided based on a suitable authentication system.

In certain cases, the viewing application 451 is separated from the application under development, such as a stand-alone operable application that has been digitally signed and/or released. In such cases, the viewing application 451 may continue to receive dynamic instructions from the design environment.

Figure 5:
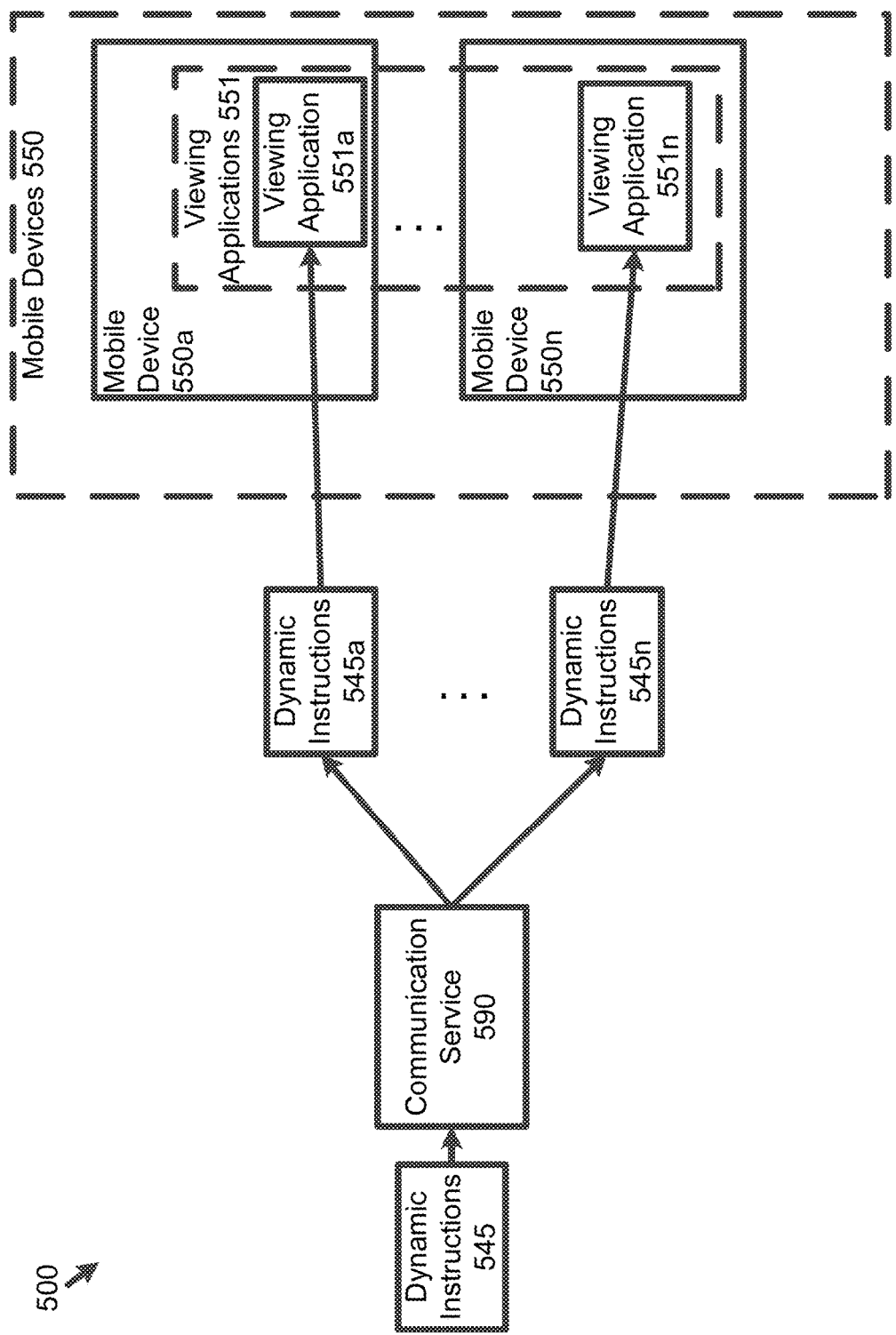
FIG. 5 is a block diagram depicting an example of a computing environment in which a communication service receives dynamic instructions, according to certain embodiments.

FIG. 5 depicts a block diagram of an exemplary computing environment 500, in which a communication service 590 receives dynamic instructions 545. The dynamic instructions 545 could be received from a design environment, such as design environment 130 described in regards to FIG. 1. In additional or alternative embodiments, responsive to the communication service 590 receiving the dynamic instructions 545, one or more viewing applications 551, operating on mobile devices 550, receive the dynamic instructions 545 from the communication service 590. For example, a first viewing application 551*a* could receive a first copy of the dynamic instructions 545*a*, while a second viewing application 551*n* could receive a second copy of the dynamic instructions 545*n*. In some embodiments, the dynamic instructions 545 are received by a subset of the viewing applications, such viewing applications 551*a*-551*n* that operate on a subset of mobile devices 550*a*-550*n* having a particular operating system.

In some embodiments, responsive to receiving the dynamic instructions 545, the communication service 590 indicates that it has received dynamic instructions that have not been communicated to the viewing applications 551. For example, the communication service 590 could set a programming "flag" to indicate that dynamic instructions 545 have been received. In additional or alternative embodiments, responsive to determining that an indicator has been set, the viewing applications 551 request the dynamic instructions 545 from the communication service 590 (e.g., a viewing application pulls the dynamic instructions). Upon receiving such a request, the communication service 590 provides the dynamic instructions 545a-545n for viewing applications 551a-551n to receive. In additional or alternative embodiments, the described exemplary operations occur in real time or nearly real time.

Figure 6:
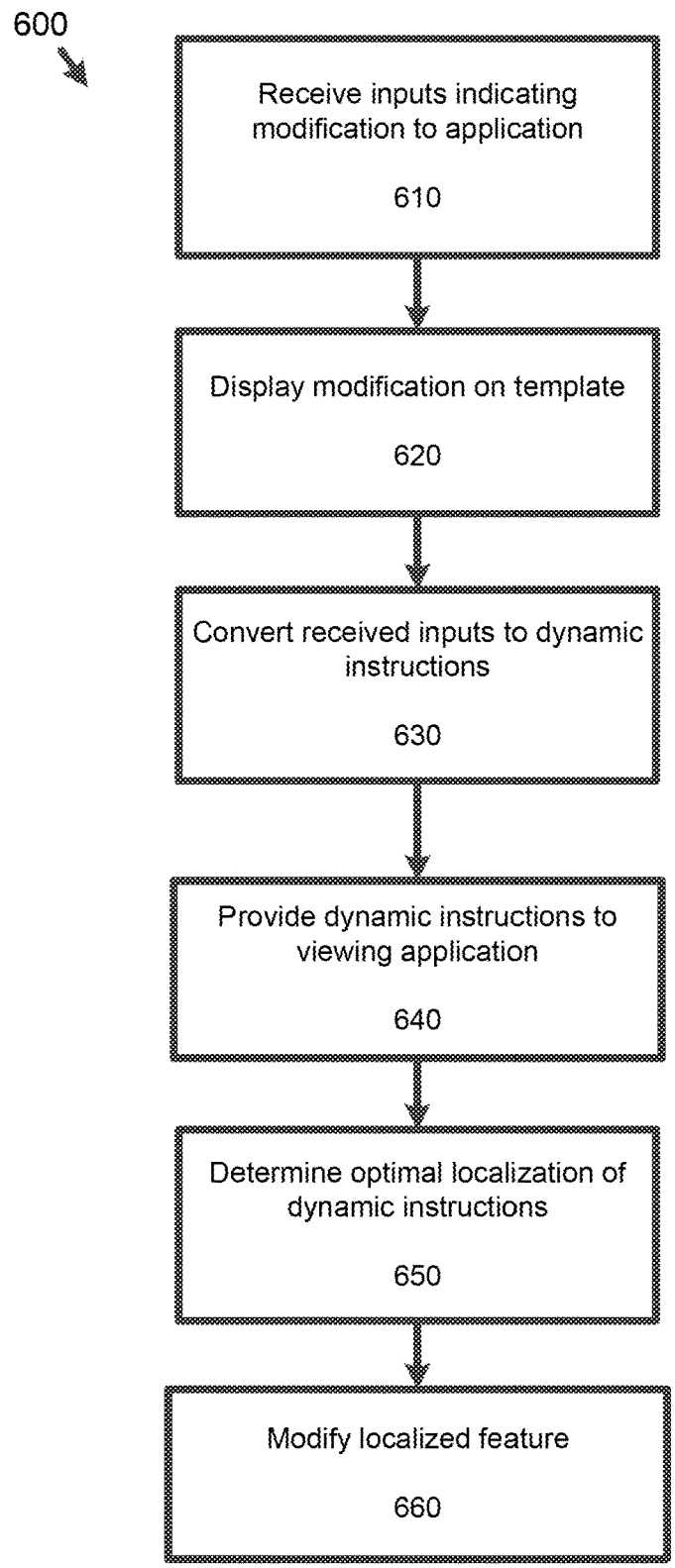
FIG. 6 is a flow chart depicting an example of a process for optimally modifying a localized feature, based on an indicated modification for a feature of an application under development.

FIG. 6 is a flow chart depicting an example of a process 600 for optimally modifying a localized feature, based on an indicated modification for a feature of an application under development. In some embodiments, such as described in regards to FIGS. 1-5, a computing device executing a design environment, or a mobile application(s) executing a viewing application(s), or both, implement operations described in FIG. 6, by executing suitable program code. For illustrative purposes, the process 600 is described with reference to the examples depicted in FIGS. 1-5. Other implementations, however, are possible.

At block 610, the process 600 involves receiving one or more inputs indicating a modification to an application under development. For example, inputs could be received in a design environment via a graphical user interface, as described in regards to FIGS. 1-5. The indicated modification could be for one or more features of the application under development, and the feature can include one or more attributes, as described elsewhere herein.

At block 620, the process 600 involves displaying the indicated modifications on a template application. For example, a design environment could modify a displayed template application, such as described in regards to FIGS. 1-5. The design environment could modify the displayed template application, or a view associated with the template application, based on the modifications indicated by the inputs.

At block 630, the process 600 involves converting the received inputs to one or more dynamic instructions. In some embodiments, the dynamic instructions are generated based on the modifications indicated by the inputs. For example, a conversion module, as described in regards to FIGS. 1-5, could identify the modification indicated by the inputs and generate dynamic instructions based on the identified modification.

At block 640, the process 600 involves providing the dynamic instructions to one or more viewing applications. In some embodiments, the dynamic instructions are provided to the viewing applications via a communication service. For example, a design environment could provide dynamic instructions to one or more viewing applications, as described in regards to FIGS. 1-5. In some embodiments, the dynamic instructions are received by the viewing applications during normal operation of the viewing applications.

At block 650, the process 600 involves determining, by the viewing application executed on the mobile device, an optimal localization of the indicated modification to the feature of the application under development. In some embodiments, a localized feature of the viewing application corresponds to the feature of the application under development. In some embodiments, determining the optimal localization is based in part on received dynamic instructions. For example, the received dynamic instructions could describe a modification to the corresponding feature of the application under development, as described in regards to FIGS. 1-5.

At block 660, the process 600 involves modifying the localized feature of the viewing application. In some embodiments, modification of the localized feature is based on the received dynamic instructions. In additional or alternative embodiments, modification of the localized feature is optimized for operation in the viewing application. For example, a localized feature of a viewing application could be modified based on received dynamic instructions, as described in regards to FIGS. 1-5.

In certain embodiments, dynamic instructions may be implemented as programming statements that are executable without compiling and/or during runtime. Dynamic instructions may use a syntax having sufficient structure to describe the represented attributes, but may omit syntax typical to high-level programming languages. Examples of suitable formats for dynamic instructions include (but are not limited to) lightweight data-interchange formats, such as ADOBE Graphic Composite (AGC) or JAVASCRIPT Object Notation (JSON). An additional non-limiting example of a suitable format is a data-interchange format that includes programming structures (e.g., objects, records, values, etc.) that describe appearance, states, behavior, functions, or any other static or dynamic attribute of another structure described by the format.

For example, the dynamic instructions could be implemented as programming statements describing attributes of a modified feature. The statements could be received, such as by a controller module enabling a localized feature, and localized attributes could be modified based on the described attributes during runtime and without compiling the received statements. In some embodiments, the dynamic instructions are common across operating environments (e.g., have similar or identical content across different mobile devices).

In additional or alternative embodiments, a controller module is implemented as a programming structure that is configured to enable a particular localized feature, or type of localized feature. The controller module may be implemented via executable code such as instructions, input interfaces, memory structures, or any other suitable code. The programming structure may be configured to, during runtime of the controller module, receive dynamic instructions and modify the particular localized feature based on the received dynamic instructions. The programming structure may be configured to optimize the enabled localized feature for a particular operating environment, based on received dynamic instructions that are identical across operating environments.

Figure 7:
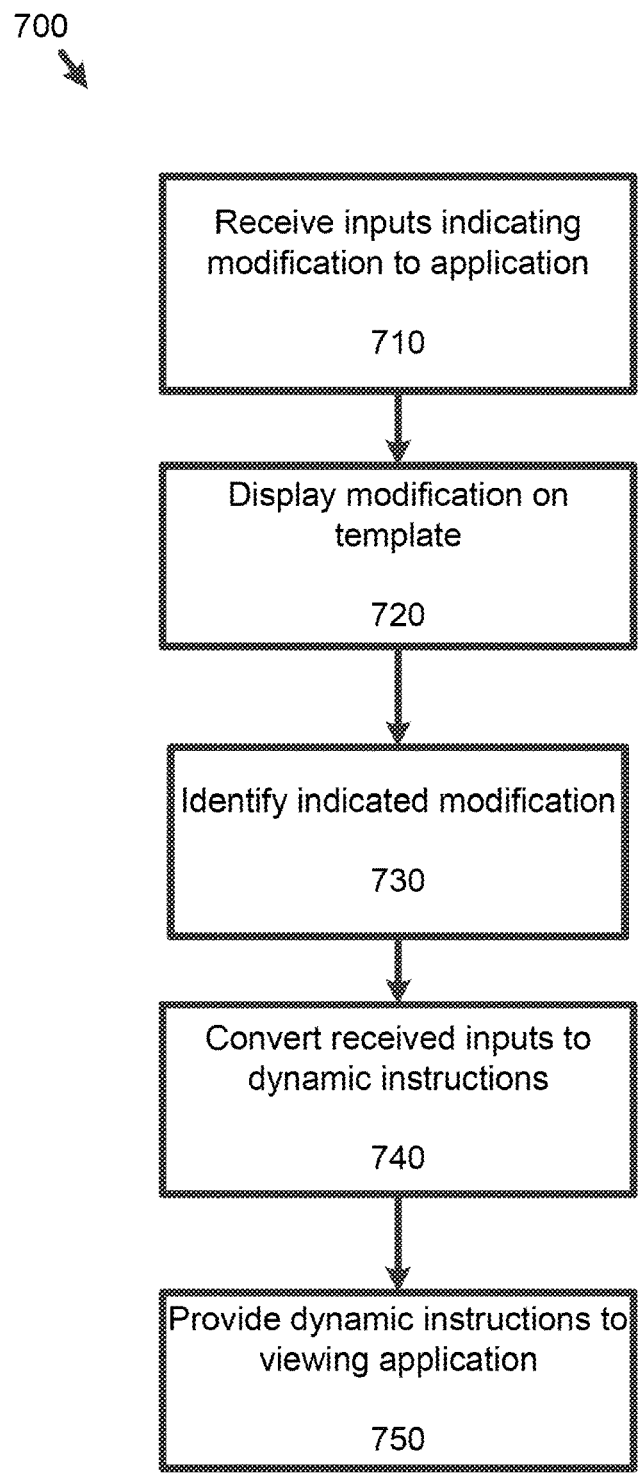
FIG. 7 is a flow chart depicting an example of a process for receiving inputs indicating a modification for a feature of an application under development, and generating dynamic instructions based on the received inputs, according to certain embodiments.

FIG. 7 is a flow chart depicting an example of a process 700 for receiving inputs indicating a modification for a feature of an application under development, and generating dynamic instructions based on the received inputs. In some embodiments, a computing device executing a design environment implements operations described in FIG. 7, by executing suitable program code. For illustrative purposes, the process 700 is described with reference to the examples depicted in FIGS. 1-6, and operations described in FIG. 7 may include or be included by other operations described herein. Other implementations, however, are possible.

At block 710, the process 700 involves receiving one or more inputs indicating a modification to an application under development. For example, inputs could be received in a design environment via a graphical user interface, as described in regards to FIGS. 1-5. The indicated modification could be for one or more features of the application under development, and the feature can include one or more attributes, as described elsewhere herein.

At block 720, the process 700 involves displaying the indicated modifications on a template application. For example, a design environment could modify a displayed template application, such as described in regards to FIGS.

1-5. The design environment could modify the displayed template application, or a view associated with the template application, based on the modifications indicated by the inputs.

At block 730, the process 700 involves identifying the indicated modifications based on received inputs. In some embodiments, a design environment interprets the received inputs, and identifies the indicated modifications based on this interpretation. For example, a conversion module included in a design environment could perform interpretation and identification, as described in regards to FIGS. 1-5. Operations related to block 730 may include, or be included by, other operations described herein, such as operations related to block 630.

As described above, other implementations of the described operations are possible. Therefore, in some embodiments, the operations associated with blocks 720 and 730 could be performed in any order.

At block 740, the process 700 involves converting the received inputs to one or more dynamic instructions. In some embodiments, the dynamic instructions are generated based on the modifications indicated by the inputs. For example, a conversion module could convert the inputs into dynamic instructions based on an identification of the indicated modification, as described in regards to FIGS. 1-5. Operations related to block 740 may include, or be included by, other operations described herein, such as operations related to block 630.

At block 750, the process 700 involves providing the dynamic instructions to one or more viewing applications. In some embodiments, the dynamic instructions are provided to the viewing applications via a communication service. For example, a design environment could provide dynamic instructions to one or more viewing applications, as described in regards to FIGS. 1-5. In some embodiments, the dynamic instructions are received by the viewing applications during normal operation of the viewing applications.

Figure 8:
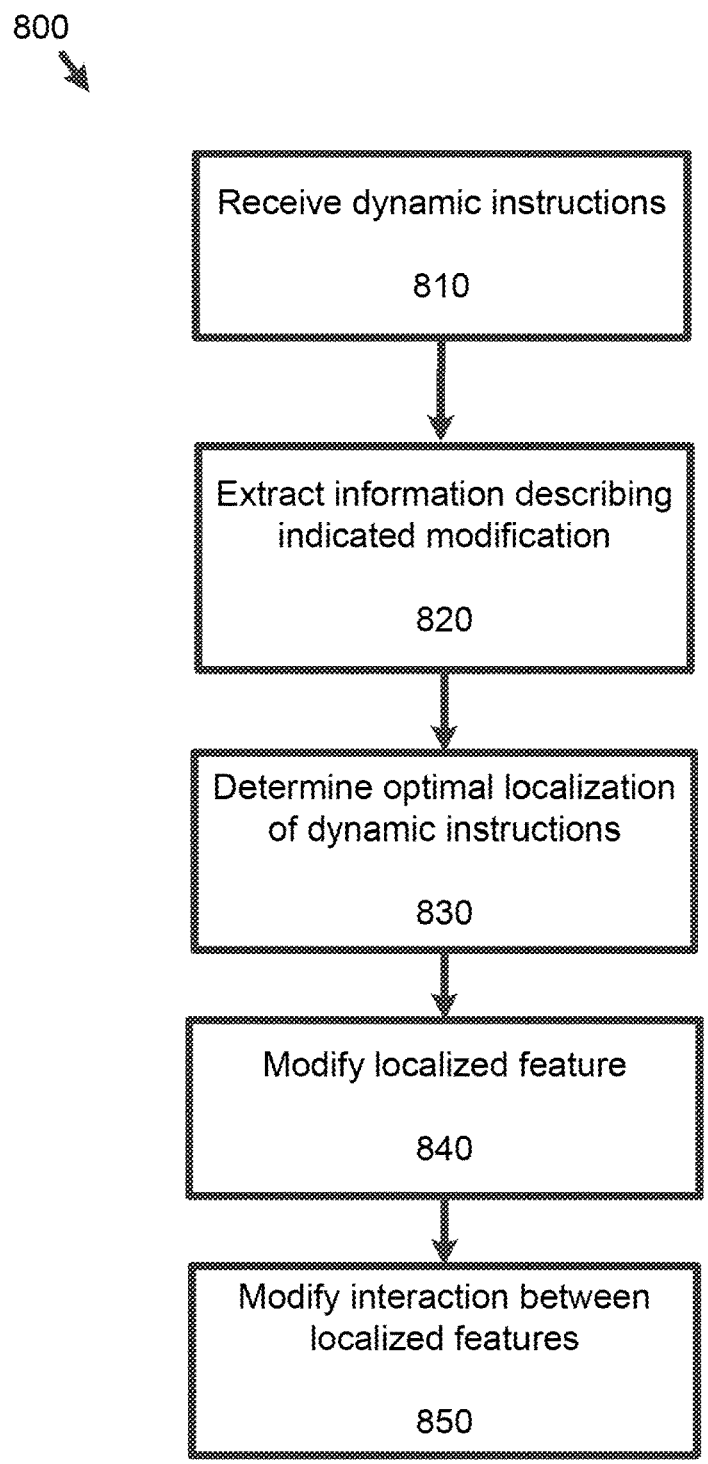
FIG. 8 is a flow chart depicting an example of a process for receiving dynamic instructions based on a modification for a feature of an application under development, and modifying a localized feature corresponding to the feature of the application, according to certain embodiments.

FIG. 8 is a flow chart depicting an example of a process 800 for receiving dynamic instructions based on a modification for a feature of an application under development, and modifying a localized feature corresponding to the feature of the application. In some embodiments, one or more mobile devices operating one or more viewing applications implement(s) operations described in FIG. 8, by executing suitable program code. For illustrative purposes, the process 800 is described with reference to the examples depicted in FIGS. 1-7, and operations described in FIG. 8 may include or be included by other operations described herein. Other implementations, however, are possible.

At block 810, the process 800 involves receiving one or more dynamic instructions describing one or more modifications to an application under development. In some embodiments, the dynamic instructions describe a modification to one or more features of the application. For example, dynamic instructions could be received from a design environment, or via a communication service, as described in regards to FIGS. 1-5. The dynamic instructions could describe a modification to a feature of the application, including modifications to one or more attributes included in the feature. Operations related to block 810 may include, or be included by, other operations described herein, such as operations related to blocks 640 or 750.

At block 820, the process 800 involves extracting information about the indicated modifications from the dynamic instructions. In some embodiments, the extracted information describes modifications to a feature of the application. For example, a controller module included in a viewing application, such as described in regards to FIGS. 1-5, could extract the information about a modification to a feature. Operations related to block 820 may include, or be included by, other operations described herein, such as operations related to block 650.

At block 830, the process 800 involves determining an optimized modification for a localized feature, based on the dynamic instructions. In some embodiments, the localized feature is enabled by a corresponding controller module. For example, a controller module could determine an optimized modification for a corresponding localized feature, as described in regards to FIGS. 1-5. Operations related to block 830 may include, or be included by, other operations described herein, such as operations related to block 650. In some embodiments, the optimized modification is determined in part based on the operating environment of the localized feature, such as the viewing application or mobile device. In additional or alternative embodiments, the optimized modification is determined in part based on the dynamic instructions, such as the information extracted in regards to block 820. Optimization may include improving the operation of the localized feature based on one or more qualities of the operating environment, such as improving an appearance of a navigation menu based on a screen size. Multiple localized features, corresponding to a same feature under development, may be receive similar or different optimizations that are based on the particular operating environment of each particular localized feature. Additionally or alternatively, a same localized feature may have a similar or different optimization that is based on various received dynamic instructions.

At block 840, the process 800 involves modifying a localized feature of a viewing application. In some embodiments, the localized feature is enabled by a controller module included in the viewing application. The localized feature corresponds to a feature of the application under development. In some embodiments, the modification of the localized feature may be optimized based on the operating environment of the localized feature. For example, the controller module could modify the localized feature to optimize operation of the localized feature, as described in regards to FIGS. 1-5. In some embodiments, modification of the localized feature occurs during operation of the viewing application. In additional or alternative embodiments, subsequent to receiving a dynamic instruction, modification of the corresponding localized feature occurs in real time or nearly real time.

Figure 9:
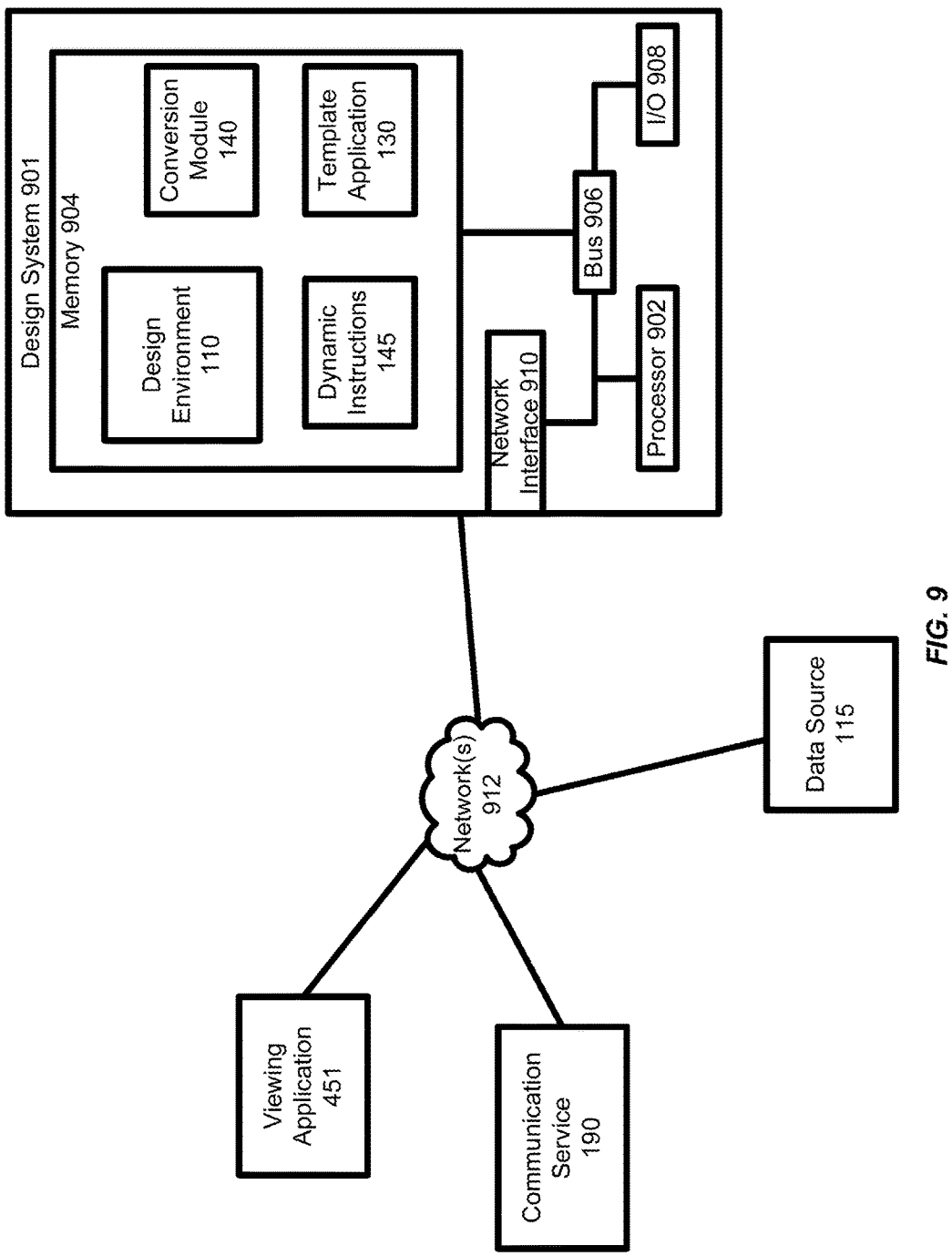
FIG. 9 is a block diagram depicting an example of an implementation of a computing system executing a development environment, according to certain embodiments.

Any suitable computing system or group of computing systems can be used for performing the operations described herein. For example, FIG. 9 is a block diagram depicting an example implementation of a design system 901 executing a design environment 110, according to certain embodiments.

The depicted design system 901 may be any suitable computing system that includes one or more processors 902 communicatively coupled to one or more memory devices 904. The processor 902 executes computer-executable program code and/or accesses information stored in the memory device 904. Examples of processor 902 include a microprocessor, an application-specific integrated circuit ("ASIC"), a field-programmable gate array ("FPGA"), or other suitable processing device. The processor 902 can include any number of processing devices, including one.

The memory device 904 includes any suitable non-transitory computer-readable medium for storing a design environment 110, a template application 130, a conversion module 140, or dynamic instructions 145. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler and/or an interpreter from code written in any suitable computer-programming language, including, for example, C, C++, C#, VISUAL BASIC, JAVA, PYTHON, Perl, JAVASCRIPT, and ACTIONSCRIPT.

The design system 901 may also include a number of external or internal devices such as input or output devices. For example, the design system 901 is shown with an input/output ("I/O") interface 908 that can receive input from input devices or provide output to output devices. A bus 906 can also be included in the design system 901. The bus 906 can communicatively couple one or more components of the design system 901.

The design system 901 executes program code that configures the processor 902 to perform one or more of the operations described above with respect to FIGS. 1-8. The program code includes, for example, one or more of the design environment 110, the template application 130, the conversion module 140, the dynamic instructions 145, or other suitable applications or memory structures that perform one or more operations described herein. The program code may be resident in the memory device 904 or any suitable computer-readable medium and may be executed by the processor 902 or any other suitable processor. In some embodiments, the program code described above, the design environment 110, the template application 130, the conversion module 140, and the dynamic instructions 145 are stored in the memory device 904, as depicted in FIG. 9. In additional or alternative embodiments, one or more of the design environment 110, the template application 130, the conversion module 140, the dynamic instructions 145, and the program code described above are stored in one or more memory devices accessible via a data network, such as a memory device accessible via a cloud service.

The design system 901 depicted in FIG. 9 also includes at least one network interface 910. The network interface 910 includes any device or group of devices suitable for establishing a wired or wireless data connection to one or more data networks 912. Non-limiting examples of the network interface 910 include an Ethernet network adapter, a modem, a wireless network adapter, and/or the like. The design system 901 is able to communicate with one or more of the data source 115, communication service 190, or the viewing application 451 using the network interface 910. The data source 115 could be any suitable repository of digital information (e.g., a database, a memory device, an optical disc). Although the data source 115 is shown in communication with design system 901 via a network 912, other embodiments are possible. For example, data source 115 could include a memory structure that resides in memory 904, or an optical disc capable of communicating via bus 906.

Figure 10:
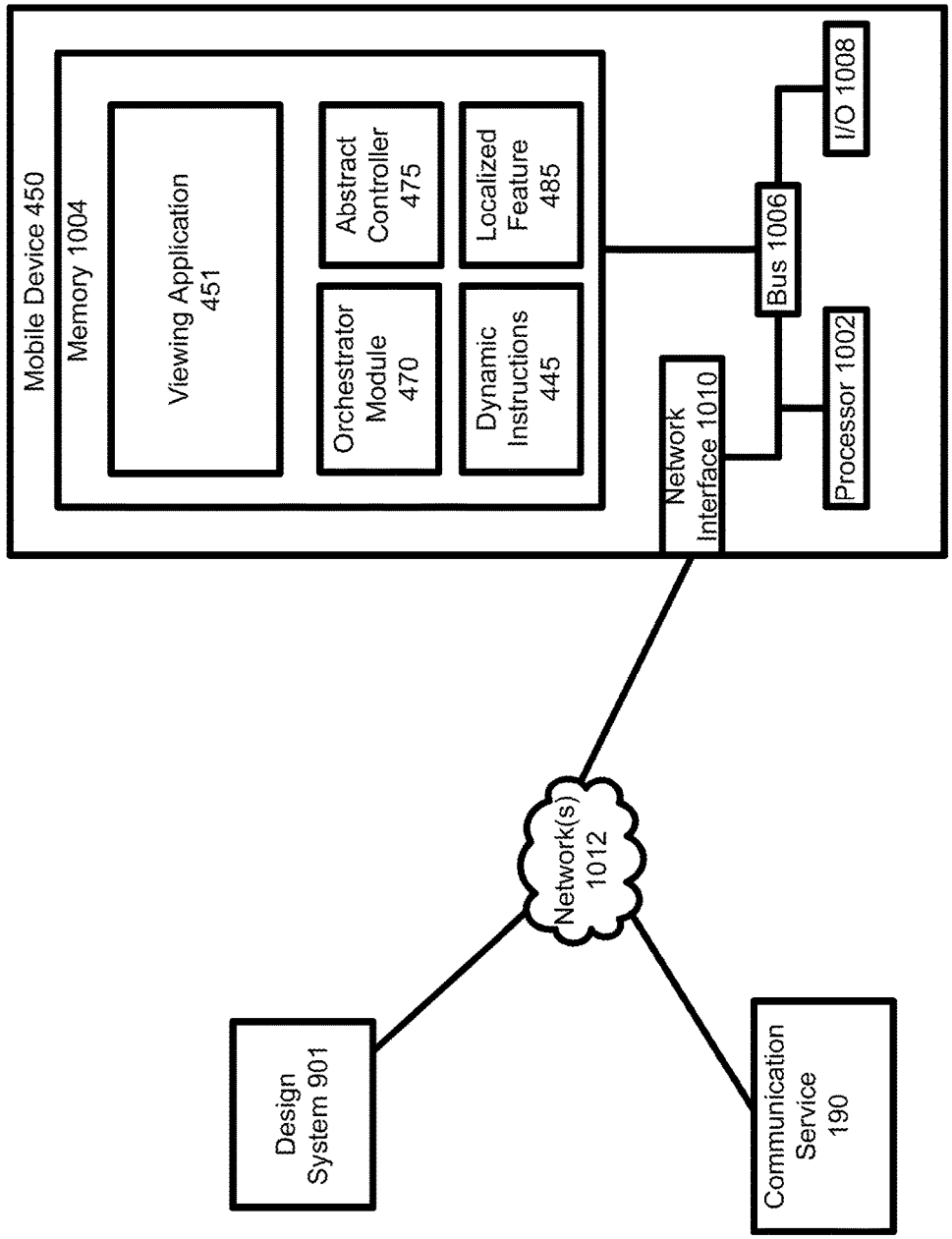
FIG. 10 is a block diagram depicting an example of an implementation of a mobile device computing system executing a viewing application, according to certain embodiments.

As an additional or alternative example, FIG. 10 is a block diagram depicting an example implementation of a mobile device 450 executing a viewing application 451, according to certain embodiments. The depicted example mobile device 450 may represent any suitable mobile computing system, such as a smart phone, tablet, or other hand-held or user-worn device. In certain embodiments, the depicted mobile device 450 may represent a laptop or desktop computer. In some embodiments, the mobile device 450 is one in a group of mobile devices. The mobile device 450 includes one or more processors 1002 communicatively coupled to one or more memory devices 1004. The processor 1002 executes computer-executable program code and/or accesses information stored in the memory device 1004. Examples of processor 1002 include a microprocessor, an application-specific integrated circuit ("ASIC"), a field-programmable gate array ("FPGA"), or other suitable processing device. The processor 1002 can include any number of processing devices, including one.

The memory device 1004 includes any suitable non-transitory computer-readable medium for storing a viewing application 451, an orchestrator module 470, a controller module 475, a localized feature 485, or dynamic instructions 445. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler and/or an interpreter from code written in any suitable computer-programming language, including, for example, C, C++, C#, VISUAL BASIC, JAVA, PYTHON, Perl, JAVASCRIPT, and ACTIONSCRIPT.

The mobile device 450 may also include a number of external or internal devices such as input or output devices. For example, the mobile device 450 is shown with an input/output ("I/O") interface 1008 that can receive input from input devices or provide output to output devices. A bus 1006 can also be included in the mobile device 450. The bus 1006 can communicatively couple one or more components of the mobile device 450.

The mobile device 450 executes program code that configures the processor 1002 to perform one or more of the operations described above with respect to FIGS. 1-8. The program code includes, for example, one or more of the viewing application 451, the orchestrator module 470, the controller module 475, the localized feature 485, or dynamic instructions 445, or other suitable applications or memory structures that perform one or more operations described herein. The program code may be resident in the memory device 1004 or any suitable computer-readable medium and may be executed by the processor 1002 or any other suitable processor. In some embodiments, the program code described above, the viewing application 451, the orchestrator module 470, the controller module 475, the localized feature 485, and dynamic instructions 445 are stored in the memory device 1004, as depicted in FIG. 10. In additional or alternative embodiments, one or more of the viewing application 451, the orchestrator module 470, the controller module 475, the localized feature 485, the dynamic instructions 445, and the program code described above are stored in one or more memory devices accessible via a data network, such as a memory device accessible via a cloud service.

The mobile device 450 depicted in FIG. 10 also includes at least one network interface 1010. The network interface 1010 includes any device or group of devices suitable for establishing a wired or wireless data connection to one or more data networks 1012. Non-limiting examples of the network interface 1010 include an Ethernet network adapter, a modem, a wireless network adapter, and/or the like. The mobile device 450 is able to communicate with one or more of the communication service 190 or a design system 901 using the network interface 1010. In some embodiments, the data networks 1012 communicate with data networks 912, as described in regards to FIG. 9. Although not depicted, the viewing application 451 can, in some embodiments, communicate with a data source, such as data source 115. In additional or alternative embodiments, viewing application 451 can communicate with a data source via network 1012, bus 1006, or using any other suitable method. In additional or alternative embodiments, the viewing application 451 could be capable of connecting to a data source during operation, including after separation from an application under development.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A non-transitory computer-readable medium embodying program code for modifying a viewing application executed on a mobile device, the viewing application included in an application under development, the program code comprising instructions which, when executed by a processor of the mobile device, cause the mobile device to perform operations comprising:
    implementing a localized feature of the viewing application, wherein the implementation includes a first optimization based on at least a quality of the mobile device;
    receiving, via a network connection and during operation of the viewing application, a dynamically executable instruction that is capable of modifying the viewing application while the viewing application is operating, wherein the dynamically executable instruction is generated by a design environment executed by a computing system, and wherein the dynamically executable instruction describes a modification corresponding to the localized feature;
    responsive to receiving the dynamically executable instruction and based on the described modification, modifying the localized feature, wherein the modification includes a second optimization based on at least the described modification, and wherein the localized feature is modified during operation of the viewing application; and
    separating the modified viewing application from the application under development, wherein the separation does not comprise compiling the modified viewing application, wherein the separation comprises providing the separated application to a repository of completed applications, and wherein the separated application is released as an operable application,
    wherein the separated application is capable of receiving an additional dynamically executable instruction, the additional dynamically executable instruction including a modification to the separated application.

2. The non-transitory computer-readable medium of claim 1, wherein the instructions comprised by the program code further cause the mobile device to modify the localized feature in real-time in response to receiving the dynamically executable instruction, wherein real-time includes a period of time that avoids delay that is noticeable by a user.

3. The non-transitory computer-readable medium of claim 1, wherein the mobile device quality on which the first optimization is based includes at least one of: an operating system of the mobile device, a hardware quality of the mobile device, or a software quality of the mobile device.

4. The non-transitory computer-readable medium of claim 1, wherein providing the separated application to a repository of completed applications comprises digitally signing the separated application.

5. The non-transitory computer-readable medium of claim 1, the program code comprising further instructions, wherein:

the localized feature is implemented by a controller module included in the viewing application;
the dynamically executable instruction is received by the controller module;
the controller module determines the second optimization for the localized feature; and
the controller module modifies the localized feature, based at least on the determined second optimization.

6. The non-transitory computer-readable medium of claim 1, the program code comprising further instructions, wherein:
an interaction between the localized feature and another localized feature is enabled by an orchestrator module included in the viewing application;
the dynamically executable instruction is additionally received by the orchestrator module; and
the orchestrator module enables the interaction, based on the received dynamically executable instruction.

7. The non-transitory computer-readable medium of claim 1, wherein operation of the viewing application includes run-time performance of functions of the viewing application.

8. A method of modifying a viewing application executing on a mobile device, the method comprising:
executing, on a mobile device, a viewing application, the viewing application included in an application under development and comprising a plurality of controller modules, wherein each controller module of the plurality of controller modules is associated with a respective localized feature of the viewing application optimized for the mobile device;
receiving, by the mobile device, via a network connection and during operation of the viewing application, a dynamically executable instruction that is capable of modifying the viewing application while the viewing application is operating, wherein the dynamically executable instruction describes a modification corresponding to a particular localized feature, and wherein the dynamically executable instruction is generated by a design environment executed by a computing system;
providing, by the mobile device during operation of the viewing application, the dynamically executable instruction to a controller module associated with the particular localized feature;
modifying, via the controller module and during operation of the viewing application, the particular localized feature, wherein modification of the particular localized feature is based on the described modification; and
separating the modified viewing application from the application under development, wherein the separation does not comprise compiling the modified viewing application, wherein the separation comprises providing the separated application to a repository of completed applications, and wherein the separated application is released as an operable application,
wherein the separated application is capable of receiving an additional dynamically executable instruction, the additional dynamically executable instruction including a modification to the separated application.

9. The method of claim 8, wherein, responsive to receiving the dynamically executable instruction, the controller module modifies the particular localized feature in real-time, wherein real-time includes a period of time that avoids delay that is noticeable by a user.

10. The method of claim 8, wherein:
the controller module implements the particular localized feature using a first optimization; and
the controller module modifies the particular localized feature using a second optimization.

11. The method of claim 10, wherein:
the first optimization improves an operation of the particular localized feature based at least on one or more qualities of the mobile device; and
the second optimization improves the operation of the particular localized feature based at least on one or more qualities of the mobile device and the described modification.

12. The method of claim 8, wherein:
an interaction between multiple controller modules of the plurality of controller modules is enabled by an orchestrator module included in the viewing application;
the dynamically executable instruction is additionally received by the orchestrator module; and
the orchestrator module enables the interaction based on the received dynamically executable instruction.

13. The method of claim 12, further comprising:
subsequent to separation of the viewing application, receiving, by the orchestrator module and during execution of the separated application, an additional dynamically executable instruction; and
enabling, by the orchestrator module and during execution of the separated application, an additional interaction between multiple controller modules of the plurality of controller modules, based on the additional dynamically executable instruction.

14. The method of claim 8, further comprising:
responsive to receiving the dynamically executable instruction describing the modification corresponding to the particular localized feature, extracting, by the controller module, information describing an indicated modification of the application under development,
wherein modification of the particular localized feature is further based on the extracted information.

15. The method of claim 8, further comprising:
providing the dynamically executable instruction describing the modification corresponding to the particular localized feature to an additional controller module associated with an additional localized feature, and
modifying, via the additional controller module, the additional localized feature based on the described modification corresponding to the particular localized feature.

16. The method of claim 15, wherein the modification of the additional localized feature is different from the modification of the particular localized feature.

* * * * *